US008243592B2

(12) United States Patent
Taylor et al.

(10) Patent No.: US 8,243,592 B2
(45) Date of Patent: Aug. 14, 2012

(54) METHODS AND SYSTEMS FOR AUTOMATICALLY REROUTING DATA IN A DATA NETWORK

(75) Inventors: William Taylor, Duluth, GA (US); David Massengill, Covington, GA (US); John Hollingsworth, Covington, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 12/551,477

(22) Filed: Aug. 31, 2009

(65) Prior Publication Data
US 2009/0323534 A1    Dec. 31, 2009

Related U.S. Application Data

(63) Continuation of application No. 10/745,116, filed on Dec. 23, 2003, now Pat. No. 7,609,623.

(51) Int. Cl.
*G01R 31/08* (2006.01)
(52) U.S. Cl. ........................................ 370/225; 370/244
(58) Field of Classification Search ........... 370/216–228
See application file for complete search history.

(56) References Cited

U.S. PATENT DOCUMENTS

| | | |
|---|---|---|
| 4,905,233 A | 2/1990 | Cain et al. |
| 5,016,244 A | 5/1991 | Massey, Jr. et al. |
| 5,065,392 A | 11/1991 | Sibbitt et al. |
| 5,241,534 A | 8/1993 | Omuro et al. |
| 5,265,092 A | 11/1993 | Soloway et al. |
| 5,375,126 A | 12/1994 | Wallace |
| 5,408,461 A | 4/1995 | Uriu et al. |
| 5,539,817 A | 7/1996 | Wilkes |
| 5,544,170 A | 8/1996 | Kasahara |
| 5,548,639 A | 8/1996 | Ogura et al. |
| 5,559,959 A | 9/1996 | Foglar |
| 5,629,938 A | 5/1997 | Cerciello et al. |
| 5,633,859 A | 5/1997 | Jain et al. |
| 5,650,994 A | 7/1997 | Daley |
| 5,754,527 A | 5/1998 | Fujita |
| 5,764,626 A | 6/1998 | VanDervort |
| 5,774,456 A | 6/1998 | Ellebracht et al. |
| 5,812,528 A | 9/1998 | VanDervort |

(Continued)

OTHER PUBLICATIONS

United States Patent and Trademark Office, "Non-Final Office Action," issued in connection with U.S. Appl. No. 10/348,077, on Jan. 4, 2007 (15 pages).

(Continued)

*Primary Examiner* — Ricky Ngo
*Assistant Examiner* — Ben H Liu
(74) *Attorney, Agent, or Firm* — Hanley, Flight and Zimmerman, LLC

(57) ABSTRACT

Methods and systems are provided for automatically rerouting data. In accordance with a disclosed example method, congestion is identified in a logical circuit. The logical circuit comprises at least a first communication path in a first local access and transport area, a second communication path in an inter-exchange carrier, and a third communication path in a second local access and transport area. The example method also involves determining that the congestion is isolated to the second communication path in the inter-exchange carrier. Data associated with the logical circuit is rerouted without manual intervention using an alternate communication path to bypass the inter-exchange carrier. The rerouting comprises routing the data through the first local access and transport area, the alternate communication path, and the second local access and transport area.

19 Claims, 6 Drawing Sheets

U.S. PATENT DOCUMENTS

| | | | |
|---|---|---|---|
| 5,832,197 | A | 11/1998 | Houji |
| 5,848,055 | A | 12/1998 | Fedyk et al. |
| 5,856,981 | A | 1/1999 | Voelker |
| 5,894,475 | A | 4/1999 | Bruno et al. |
| 5,926,456 | A | 7/1999 | Takano et al. |
| 5,936,939 | A | 8/1999 | Des Jardins et al. |
| 6,028,863 | A | 2/2000 | Sasagawa et al. |
| 6,038,219 | A | 3/2000 | Mawhinney et al. |
| 6,091,951 | A | 7/2000 | Sturniolo et al. |
| 6,104,998 | A | 8/2000 | Galand et al. |
| 6,108,300 | A | 8/2000 | Coile et al. |
| 6,108,307 | A | 8/2000 | McConnell et al. |
| 6,118,763 | A | 9/2000 | Trumbull |
| 6,147,998 | A | 11/2000 | Kelley et al. |
| 6,167,025 | A | 12/2000 | Hsing et al. |
| 6,181,675 | B1 | 1/2001 | Miyamoto |
| 6,181,679 | B1 | 1/2001 | Ashton et al. |
| 6,185,695 | B1 | 2/2001 | Murphy et al. |
| 6,195,416 | B1 | 2/2001 | DeCaluwe et al. |
| 6,259,696 | B1 | 7/2001 | Yazaki et al. |
| 6,269,401 | B1 | 7/2001 | Fletcher et al. |
| 6,311,288 | B1 | 10/2001 | Heeren et al. |
| 6,360,260 | B1 | 3/2002 | Compliment et al. |
| 6,366,581 | B1 | 4/2002 | Jepsen |
| 6,377,548 | B1 | 4/2002 | Chuah |
| 6,421,722 | B1 | 7/2002 | Bauer et al. |
| 6,424,629 | B1 | 7/2002 | Rubino et al. |
| 6,449,259 | B1 | 9/2002 | Allain et al. |
| 6,456,306 | B1 | 9/2002 | Chin et al. |
| 6,473,398 | B1 | 10/2002 | Wall et al. |
| 6,535,990 | B1 | 3/2003 | Iterum et al. |
| 6,538,987 | B1 | 3/2003 | Cedrone et al. |
| 6,549,533 | B1 | 4/2003 | Campbell |
| 6,553,015 | B1 | 4/2003 | Sato |
| 6,556,659 | B1 | 4/2003 | Bowman-Amuah |
| 6,570,846 | B1 | 5/2003 | Ryoo |
| 6,581,166 | B1 | 6/2003 | Hirst et al. |
| 6,590,899 | B1 | 7/2003 | Thomas et al. |
| 6,594,246 | B1 | 7/2003 | Jorgensen |
| 6,594,268 | B1 | 7/2003 | Aukia et al. |
| 6,597,689 | B1 | 7/2003 | Chiu et al. |
| 6,608,831 | B1 | 8/2003 | Beckstrom et al. |
| 6,625,114 | B1 | 9/2003 | Hassell |
| 6,643,254 | B1 | 11/2003 | Kajitani et al. |
| 6,687,228 | B1 | 2/2004 | Fichou et al. |
| 6,697,329 | B1 * | 2/2004 | McAllister et al. ........... 370/235 |
| 6,711,125 | B1 | 3/2004 | Walrand et al. |
| 6,716,165 | B1 | 4/2004 | Flanders et al. |
| 6,738,459 | B1 | 5/2004 | Johnstone et al. |
| 6,763,476 | B1 | 7/2004 | Dangi et al. |
| 6,766,113 | B1 | 7/2004 | Al-Salameh et al. |
| 6,778,525 | B1 | 8/2004 | Baum et al. |
| 6,781,952 | B2 | 8/2004 | Shirakawa |
| 6,795,393 | B1 | 9/2004 | Mazzurco et al. |
| 6,795,394 | B1 | 9/2004 | Swinkels et al. |
| 6,810,043 | B1 | 10/2004 | Naven et al. |
| 6,823,477 | B1 | 11/2004 | Cheng et al. |
| 6,826,184 | B1 | 11/2004 | Bryenton et al. |
| 6,829,223 | B1 | 12/2004 | Richardson et al. |
| 6,842,513 | B1 * | 1/2005 | Androski et al. ........ 379/220.01 |
| 6,850,483 | B1 | 2/2005 | Semaan |
| 6,862,351 | B2 | 3/2005 | Taylor |
| 6,865,170 | B1 | 3/2005 | Zendle |
| 6,882,652 | B1 | 4/2005 | Scholtens et al. |
| 6,885,678 | B2 * | 4/2005 | Curry et al. ................... 370/467 |
| 6,925,578 | B2 | 8/2005 | Lam et al. |
| 6,952,395 | B1 | 10/2005 | Manoharan et al. |
| 6,973,034 | B1 | 12/2005 | Natarajan et al. |
| 6,973,037 | B1 | 12/2005 | Kahveci |
| 6,978,394 | B1 | 12/2005 | Charny et al. |
| 6,981,039 | B2 | 12/2005 | Cerami et al. |
| 6,983,401 | B2 | 1/2006 | Taylor |
| 6,990,616 | B1 | 1/2006 | Botton-Dascal et al. |
| 7,006,443 | B2 | 2/2006 | Storr |
| 7,012,898 | B1 * | 3/2006 | Farris et al. ................... 370/252 |
| 7,027,053 | B2 | 4/2006 | Berndt et al. |
| 7,035,202 | B2 | 4/2006 | Callon |
| 7,043,250 | B1 * | 5/2006 | DeMartino ................... 455/445 |
| 7,072,331 | B2 | 7/2006 | Liu et al. |
| 7,093,155 | B2 | 8/2006 | Aoki |
| 7,120,148 | B1 | 10/2006 | Batz et al. |
| 7,120,819 | B1 | 10/2006 | Gurer et al. |
| 7,146,000 | B2 | 12/2006 | Hollman et al. |
| 7,165,192 | B1 | 1/2007 | Cadieux et al. |
| 7,184,439 | B1 * | 2/2007 | Aubuchon et al. ......... 370/395.1 |
| 7,200,148 | B1 | 4/2007 | Taylor et al. |
| 7,209,452 | B2 | 4/2007 | Taylor et al. |
| 7,240,364 | B1 | 7/2007 | Branscomb et al. |
| 7,275,192 | B2 | 9/2007 | Taylor et al. |
| 7,287,083 | B1 | 10/2007 | Nay et al. |
| 7,350,099 | B2 | 3/2008 | Taylor et al. |
| 7,391,734 | B2 | 6/2008 | Taylor et al. |
| 7,457,233 | B1 | 11/2008 | Gan et al. |
| 7,460,468 | B2 | 12/2008 | Taylor et al. |
| 7,466,646 | B2 | 12/2008 | Taylor et al. |
| 7,469,282 | B2 | 12/2008 | Taylor et al. |
| 7,483,370 | B1 | 1/2009 | Dayal et al. |
| 7,609,623 | B2 | 10/2009 | Taylor et al. |
| 7,630,302 | B2 | 12/2009 | Taylor et al. |
| 7,639,606 | B2 | 12/2009 | Taylor et al. |
| 7,639,623 | B2 | 12/2009 | Taylor et al. |
| 7,646,707 | B2 | 1/2010 | Taylor et al. |
| 7,768,904 | B2 | 8/2010 | Taylor et al. |
| 8,031,588 | B2 | 10/2011 | Taylor et al. |
| 8,031,620 | B2 | 10/2011 | Taylor et al. |
| 2001/0000700 | A1 | 5/2001 | Eslambolchi et al. |
| 2001/0010681 | A1 | 8/2001 | McAllister et al. |
| 2002/0001307 | A1 | 1/2002 | Nguyen et al. |
| 2002/0072358 | A1 | 6/2002 | Schneider et al. |
| 2002/0089985 | A1 | 7/2002 | Wahl et al. |
| 2002/0112072 | A1 | 8/2002 | Jain |
| 2002/0131362 | A1 | 9/2002 | Callon |
| 2002/0172148 | A1 | 11/2002 | Kim et al. |
| 2002/0181402 | A1 | 12/2002 | Lemoff et al. |
| 2003/0043753 | A1 | 3/2003 | Nelson et al. |
| 2003/0051049 | A1 | 3/2003 | Noy et al. |
| 2003/0051195 | A1 | 3/2003 | Bosa et al. |
| 2003/0086413 | A1 | 5/2003 | Tartarelli et al. |
| 2003/0091024 | A1 | 5/2003 | Stumer |
| 2003/0092390 | A1 | 5/2003 | Haumont |
| 2003/0117951 | A1 | 6/2003 | Wiebe et al. |
| 2003/0128692 | A1 | 7/2003 | Mitsumori et al. |
| 2003/0152028 | A1 | 8/2003 | Raisanen et al. |
| 2003/0185151 | A1 | 10/2003 | Kurosawa et al. |
| 2004/0090918 | A1 | 5/2004 | McLendon |
| 2004/0090973 | A1 | 5/2004 | Christie et al. |
| 2004/0125776 | A1 | 7/2004 | Haugli et al. |
| 2004/0141464 | A1 | 7/2004 | Taylor et al. |
| 2004/0172574 | A1 | 9/2004 | Wing et al. |
| 2004/0202112 | A1 | 10/2004 | McAllister et al. |
| 2005/0002339 | A1 | 1/2005 | Patil et al. |
| 2005/0013242 | A1 | 1/2005 | Chen et al. |
| 2005/0135237 | A1 | 6/2005 | Taylor et al. |
| 2005/0135238 | A1 | 6/2005 | Taylor et al. |
| 2005/0135254 | A1 | 6/2005 | Taylor et al. |
| 2005/0135263 | A1 | 6/2005 | Taylor et al. |
| 2005/0138203 | A1 | 6/2005 | Taylor et al. |
| 2005/0138476 | A1 | 6/2005 | Taylor et al. |
| 2005/0152028 | A1 | 7/2005 | Mitzkus |
| 2005/0172160 | A1 | 8/2005 | Taylor et al. |
| 2005/0172174 | A1 | 8/2005 | Taylor et al. |
| 2005/0237925 | A1 | 10/2005 | Taylor et al. |
| 2005/0238006 | A1 | 10/2005 | Taylor et al. |
| 2005/0238007 | A1 | 10/2005 | Taylor et al. |
| 2005/0238024 | A1 | 10/2005 | Taylor et al. |
| 2005/0240840 | A1 | 10/2005 | Taylor et al. |
| 2005/0276216 | A1 | 12/2005 | Vasseur et al. |
| 2006/0013210 | A1 | 1/2006 | Bordogna et al. |
| 2006/0146700 | A1 | 7/2006 | Taylor et al. |
| 2006/0153066 | A1 | 7/2006 | Saleh et al. |
| 2007/0050492 | A1 | 3/2007 | Jorgensen |
| 2007/0168200 | A1 | 7/2007 | Shimizu |
| 2009/0041012 | A1 | 2/2009 | Taylor et al. |
| 2009/0086626 | A1 | 4/2009 | Taylor et al. |
| 2009/0103544 | A1 | 4/2009 | Taylor et al. |
| 2010/0020677 | A1 | 1/2010 | Taylor et al. |

| | | |
|---|---|---|
| 2010/0046366 A1 | 2/2010 | Taylor et al. |
| 2010/0046380 A1 | 2/2010 | Taylor et al. |
| 2010/0054122 A1 | 3/2010 | Taylor et al. |

OTHER PUBLICATIONS

United States Patent and Trademark Office, "Interview Summary," issued in connection with U.S. Appl. No. 10/348,077, on May 11, 2007 (2 pages).

United States Patent and Trademark Office, "Final Office Action," issued in connection with U.S. Appl. No. 10/348,077, on Aug. 10, 2007 (26 pages).

United States Patent and Trademark Office, "Notice of Allowance," issued in connection with U.S. Appl. No. 10/348,077, on Apr. 29, 2008 (10 pages).

United States Patent and Trademark Office, "Notice of Allowance," issued in connection with U.S. Appl. No. 10/348,592, on Oct. 14, 2008 (4 pages).

United States Patent and Trademark Office, "Final Office Action," issued in connection with U.S. Appl. No. 10/348,592, on Mar. 21, 2008 (11 pages).

United States Patent and Trademark Office, "Non-Final Office Action," issued in connection with U.S. Appl. No. 10/348,592, on Jun. 14, 2007 (10 pages).

United States Patent and Trademark Office, "Non-Final Office Action," issued in connection with U.S. Appl. No. 10/348,592, on Sep. 8, 2006 (7 pages).

United States Patent and Trademark Office, "Notice of Allowance," issued in connection with U.S. Appl. No. 10/744,281, on Oct. 30, 2007 (8 pages).

United States Patent and Trademark Office, "Notice of Allowance," issued in connection with U.S. Appl. No. 10/744,281, on Aug. 27, 2007 (6 pages).

United States Patent and Trademark Office, "Interview Summary," issued in connection with U.S. Appl. No. 10/744,281, on Aug. 6, 2007 (3 pages).

United States Patent and Trademark Office, "Final Office Action," issued in connection with U.S. Appl. No. 10/744,281, on Apr. 17, 2007 (18 pages).

United States Patent and Trademark Office, "Interview Summary," issued in connection with U.S. Appl. No. 10/744,281, on Nov. 27, 2006 (3 pages).

United States Patent and Trademark Office, "Non-Final Office Action," issued in connection with U.S. Appl. No. 10/744,281, on Oct. 2, 2006 (16 pages).

United States Patent and Trademark Office, "Notice of Allowance," issued in connection with U.S. Appl. No. 10/744,283, on Sep. 18, 2009 (11 pages).

United States Patent and Trademark Office, "Non-Final Office Action," issued in connection with U.S. Appl. No. 10/744,283, on Apr. 14, 2009 (13 pages).

United States Patent and Trademark Office, "Non-Final Office Action," issued in connection with U.S. Appl. No. 10/744,283, on Oct. 30, 2008 (13 pages).

United States Patent and Trademark Office, "Final Office Action," issued in connection with U.S. Appl. No. 10/744,283, on Apr. 17, 2008 (11 pages).

United States Patent and Trademark Office, "Non-Final Office Action," issued in connection with U.S. Appl. No. 10/744,283, on Jul. 20, 2007 (12 pages).

United States Patent and Trademark Office, "Final Office Action," issued in connection with U.S. Appl. No. 10/744,555, on Jul. 17, 2009 (27 pages).

United States Patent and Trademark Office, "Non-Final Office Action," issued in connection with U.S. Appl. No. 10/744,555, on Jan. 14, 2009 (37 pages).

United States Patent and Trademark Office, "Final Office Action," issued in connection with U.S. Appl. No. 10/744,555, on May 12, 2008 (34 pages).

United States Patent and Trademark Office, "Non-Final Office Action," issued in connection with U.S. Appl. No. 10/744,555, on Aug. 6, 2007 (18 pages).

United States Patent and Trademark Office, "Final Office Action," issued in connection with U.S. Appl. No. 10/744,921, on Apr. 6, 2009 (23 pages).

United States Patent and Trademark Office, "Non-Final Office Action," issued in connection with U.S. Appl. No. 10/744,921, on Oct. 31, 2008 (23 pages).

United States Patent and Trademark Office, "Final Office Action," issued in connection with U.S. Appl. No. 10/744,921, on May 1, 2008 (24 pages).

United States Patent and Trademark Office, "Non-Final Office Action," issued in connection with U.S. Appl. No. 10/744,921, on Aug. 8, 2007 (16 pages).

United States Patent and Trademark Office, "Non-Final Office Action," issued in connection with U.S. Appl. No. 10/744,921, on Jul. 9, 2009 (24 pages).

United States Patent and Trademark Office, "Final Office Action," issued in connection with U.S. Appl. No. 10/745,047, on Mar. 27, 2009 (18 pages).

United States Patent and Trademark Office, "Non-Final Office Action," issued in connection with U.S. Appl. No. 10/745,047, on Jun. 12, 2008 (18 pages).

United States Patent and Trademark Office, "Notice of Allowance," issued in connection with U.S. Appl. No. 10/745,047, on Jul. 23, 2009 (7 pages).

United States Patent and Trademark Office, "Notice of Allowance," issued in connection with U.S. Appl. No. 10/745,116, on Aug. 14, 2009 (7 pages).

United States Patent and Trademark Office, "Notice of Allowance," issued in connection with U.S. Appl. No. 10/745,116, on May 7, 2009 (17 pages).

United States Patent and Trademark Office, "Final Office Action," issued in connection with U.S. Appl. No. 10/745,116, on Apr. 28, 2008 (25 pages).

United States Patent and Trademark Office, "Notice of Allowance," issued in connection with U.S. Appl. No. 10/745,116, on Dec. 3, 2008 (8 pages).

United States Patent and Trademark Office, "Non-Final Office Action," issued in connection with U.S. Appl. No. 10/745,116, on Aug. 7, 2007 (20 pages).

United States Patent and Trademark Office, "Notice of Allowance," issued in connection with U.S. Appl. No. 10/745,117, on May 14, 2009 (30 pages).

United States Patent and Trademark Office, "Non-Final Office Action," issued in connection with U.S. Appl. No. 10/745,117, on Nov. 26, 2008 (21 pages).

United States Patent and Trademark Office, "Final Office Action," issued in connection with U.S. Appl. No. 10/745,117, on May 12, 2008 (15 pages).

United States Patent and Trademark Office, "Non-Final Office Action," issued in connection with U.S. Appl. No. 10/745,117, on Apr. 17, 2008 (15 pages).

United States Patent and Trademark Office, "Non-Final Office Action," issued in connection with U.S. Appl. No. 10/745,117, on Aug. 8, 2007 (14 pages).

United States Patent and Trademark Office, "Supplemental Notice of Allowance," issued in connection with U.S. Appl. No. 10/745,117, on Jun. 15, 2009 (4 pages).

United States Patent and Trademark Office, "Notice of Allowance," issued in connection with U.S. Appl. No. 10/745,117, on Aug. 27, 2009 (7 pages).

United States Patent and Trademark Office, "Non-Final Office Action," issued in connection with U.S. Appl. No. 10/745,168, on Dec. 2, 2008 (25 pages).

United States Patent and Trademark Office, "Final Office Action," issued in connection with U.S. Appl. No. 10/745,168, on May 2, 2008 (21 pages).

United States Patent and Trademark Office, "Final Office Action," issued in connection with U.S. Appl. No. 10/745,168, on Aug. 8, 2007 (17 pages).

United States Patent and Trademark Office, "Notice of Allowance," issued in connection with U.S. Appl. No. 10/745,168, on Jun. 12, 2009 (22 pages).

United States Patent and Trademark Office, "Notice of Allowance," issued in connection with U.S. Appl. No. 10/745,168, on Aug. 7, 2009 (7 pages).

United States Patent and Trademark Office, "Final Office Action," issued in connection with U.S. Appl. No. 10/745,170, on Apr. 28, 2009 (21 pages).

United States Patent and Trademark Office, "Non-Final Office Action," issued in connection with U.S. Appl. No. 10/745,170, on Nov. 14, 2008 (21 pages).

United States Patent and Trademark Office, "Advisory Action," issued in connection with U.S. Appl. No. 10/745,170, on Oct. 21, 2008 (3 pages).

United States Patent and Trademark Office, "Final Office Action," issued in connection with U.S. Appl. No. 10/745,170, on Apr. 17, 2008 (14 pages).

United States Patent and Trademark Office, "Non-Final Office Action," issued in connection with U.S. Appl. No. 10/745,170, on Jul. 20, 2007 (14 pages).

United States Patent and Trademark Office, "Non-Final Office Action," issued in connection with U.S. Appl. No. 10/745,170, on Oct. 14, 2009 (23 pages).

United States Patent and Trademark Office, "Final Office Action," issued in connection with U.S. Appl. No. 10/829,495, on Mar. 23, 2009 (26 pages).

United States Patent and Trademark Office, "Non-Final Office Action," issued in connection with U.S. Appl. No. 10/829,495, on Oct. 29, 2008 (25 pages).

United States Patent and Trademark Office, "Final Office Action," issued in connection with U.S. Appl. No. 10/829,495, on Jun. 11, 2008 (22 pages).

United States Patent and Trademark Office, "Non-Final Office Action," issued in connection with U.S. Appl. No. 10/829,495, on Sep. 7, 2007 (24 pages).

United States Patent and Trademark Office, "Advisory Action," issued in connection with U.S. Appl. No. 10/829,495, on Jun. 4, 2009 (3 pages).

United States Patent and Trademark Office, "Non-Final Office Action," issued in connection with U.S. Appl. No. 10/829,495, on Oct. 1, 2009 (28 pages).

United States Patent and Trademark Office, "Interview Summary," issued in connection with U.S. Appl. No. 10/829,509, on Sep. 20, 2006 (4 pages).

United States Patent and Trademark Office, "Notice of Allowance," issued in connection with U.S. Appl. No. 10/829,509, on Jul. 10, 2007 (7 pages).

United States Patent and Trademark Office, "Notice of Allowance," issued in connection with U.S. Appl. No. 10/829,509, on Feb. 1, 2007 (8 pages).

United States Patent and Trademark Office, "Final Office Action," issued in connection with U.S. Appl. No. 10/829,509, on Nov. 13, 2006 (12 pages).

United States Patent and Trademark Office, "Non-Final Office Action," issued in connection with U.S. Appl. No. 10/829,509, on May 15, 2006 (11 pages).

United States Patent and Trademark Office, "Final Office Action," issued in connection with U.S. Appl. No. 10/829,539, on Mar. 13, 2009 (29 pages).

United States Patent and Trademark Office, "Non-Final Office Action," issued in connection with U.S. Appl. No. 10/829,539, on Nov. 25, 2008 (23 pages).

United States Patent and Trademark Office, "Final Office Action," issued in connection with U.S. Appl. No. 10/829,539, on Aug. 20, 2008 (29 pages).

United States Patent and Trademark Office, "Interview Summary," issued in connection with U.S. Appl. No. 10/829,539, on Apr. 28, 2008 (2 pages).

United States Patent and Trademark Office, "Non-Final Office Action," issued in connection with U.S. Appl. No. 10/829,539, on Oct. 17, 2007 (19 pages).

United States Patent and Trademark Office, "Advisory Action," issued in connection with U.S. Appl. No. 10/829,539, on Jun. 12, 2009 (3 pages).

United States Patent and Trademark Office, "Non-Final Office Action," issued in connection with U.S. Appl. No. 10/829,539, on Aug. 25, 2009 (41 pages).

United States Patent and Trademark Office, "Office Communication—No. Action Count," issued in connection with U.S. Appl. No. 10/829,584, on Oct. 16, 2008 (4 pages).

United States Patent and Trademark Office, "Notice of Allowance," issued in connection with U.S. Appl. No. 10/829,584, on Sep. 22, 2008 (7 pages).

United States Patent and Trademark Office, "Final Office Action," issued in connection with U.S. Appl. No. 10/829,584, on Jun. 25, 2008 (20 pages).

United States Patent and Trademark Office, "Non-Final Office Action," issued in connection with U.S. Appl. No. 10/829,584, on Sep. 19, 2007 (15 pages).

United States Patent and Trademark Office, "Supplemental Notice of Allowance," issued in connection with U.S. Appl. No. 10/829,795, on Nov. 13, 2008 (2 pages).

United States Patent and Trademark Office, "Notice of Allowance," issued in connection with U.S. Appl. No. 10/829,795, on Sep. 9, 2008 (7 pages).

United States Patent and Trademark Office, "Final Office Action," issued in connection with U.S. Appl. No. 10/829,795, on Apr. 30, 2008 (20 pages).

United States Patent and Trademark Office, "Non-Final Office Action," issued in connection with U.S. Appl. No. 10/829,795, on Sep. 10, 2007 (21 pages).

United States Patent and Trademark Office, "Interview Summary," issued in connection with U.S. Appl. No. 10/829,795, on Aug. 1, 2008 (2 pages).

Don Ryan, The Telco Handbook for New Technicians—An Introduction to Telco Technology and Troubleshooting, Oct. 27, 2000, [retrieved from http://www.darkwing.net/aaron/telco.doc, accessed on Nov. 11, 2006], 67 pages.

Chen, Thomas M. and Liu, Steve S., Management and Control Functions in ATM Switching Systems, IEEE Network, Jul./Aug. 1994 (7 pages).

Meserole, Thomas A. and Prasad, Anil Customer Network Management (CNM) for ATM Public Network Service (M3 Specification), af-nm-0019.000, Rev. 1.04, Oct. 1994 (13 pages).

Mangan, Tim, OA&M: How a Frame Relay SLA is Measured and Diagnosed, http://www.mfaforum.org/frame/Whitepaper/whitepapers/OAMwhitepaper.shtml (11 pages).

United States Patent and Trademark Office, "Non-Final Office Action," issued in connection with U.S. Appl. No. 10/744,555, on Apr. 14, 2011 (19 pages).

United States Patent and Trademark Office, "Non-Final Office Action," issued in connection with U.S. Appl. No. 12/254,233, on Mar. 25, 2011 (28 pages).

United States Patent and Trademark Office, "Non-Final Office Action," issued in connection with U.S. Appl. No. 12/334,248, on Mar. 25, 2011 (28 pages).

United States Patent and Trademark Office, "Non-Final Office Action," issued in connection with U.S. Appl. No. 12/609,415, on Dec. 9, 2010 (12 pages).

United States Patent and Trademark Office, "Non-Final Office Action," issued in connection with U.S. Appl. No. 12/609,640, on Dec. 9, 2010 (11 pages).

United States Patent and Trademark Office, "Final Office Action," issued in connection with U.S. Appl. No. 10/744,555, on Oct. 7, 2010 (26 pages).

United States Patent and Trademark Office, "Non-Final Office Action," issued in connection with U.S. Appl. No. 10/744,555, on Feb. 1, 2010 (26 pages).

United States Patent and Trademark Office, "Final Office Action," issued in connection with U.S. Appl. No. 10/744,921, on Mar. 3, 2010 (23 pages).

United States Patent and Trademark Office, "Final Office Action," issued in connection with U.S. Appl. No. 10/745,170, on Oct. 26, 2010 (24 pages).

United States Patent and Trademark Office, "Non-Final Office Action," issued in connection with U.S. Appl. No. 10/745,170, on Mar. 30, 2010 (24 pages).

United States Patent and Trademark Office, "Notice of Allowance," issued in connection with U.S. Appl. No. 10/829,495, on Apr. 29, 2010 (7 pages).

United States Patent and Trademark Office, "Non-Final Office Action," issued in connection with U.S. Appl. No. 10/829,539, on Apr. 27, 2010 (32 pages).

United States Patent and Trademark Office, "Final Office Action," issued in connection with U.S. Appl. No. 10/829,539, on Sep. 23, 2010 (32 pages).

United States Patent and Trademark Office, "Final Office Action," issued in connection with U.S. Appl. No. 12/254,233, on Sep. 29, 2010 (26 pages).

United States Patent and Trademark Office, "Non-Final Office Action," issued in connection with U.S. Appl. No. 12/334,248, on Apr. 13, 2010 (23 pages).

United States Patent and Trademark Office, "Final Office Action," issued in connection with U.S. Appl. No. 12/334,248, on Sep. 29, 2010 (25 pages).

United States Patent and Trademark Office, "Non-Final Office Action," issued in connection with U.S. Appl. No. 12/339,426, on Mar. 8, 2010 (6 pages).

United States Patent and Trademark Office, "Notice of Allowance," issued in connection with U.S. Appl. No. 12/339,426, on Nov. 8, 2010 (9 pages).

United States Patent and Trademark Office, "Non-Final Office Action," issued in connection with U.S. Appl. No. 12/570,938, on Oct. 7, 2010 (19 pages).

United States Patent and Trademark Office, "Non-Final Office Action," issued in connection with U.S. Appl. No. 12/609,683, on Oct. 25, 2010 (15 pages).

United States Patent and Trademark Office, "Notice of Panel Decision from Pre-Appeal Brief Review," issued in connection with U.S. Appl. No. 10/744,921, on Sep. 7, 2010 (2 pages).

United States Patent and Trademark Office, "Non-Final Office Action," issued in connection with U.S. Appl. No. 12/254,233, on Apr. 15, 2010 (24 pages).

United States Patent and Trademark Office, "Notice of Allowance," issued in connection with U.S. Appl. No. 10/744,555, on Feb. 6, 2012. (8 pages).

United States Patent and Trademark Office, "Non-Final Office Action," issued in connection with U.S. Appl. No. 10/744,921, on May 11, 2011 (20 pages).

United States Patent and Trademark Office, "Notice of Allowance," issued in connection with U.S. Appl. No. 10/745,170, on Dec. 27, 2011 (10 pages).

United States Patent and Trademark Office, "Non-Final Office Action," issued in connection with U.S. Appl. No. 10/829,539, on Mar. 22, 2011 (35 pages).

United States Patent and Trademark Office, "Final Office Action," issued in connection with U.S. Appl. No. 10/829,539, on Sep. 29, 2011 (37 pages).

United States Patent and Trademark Office, "Non-Final Office Action," issued in connection with U.S. Appl. No. 10/829,539, on Jan. 30, 2012 (37 pages).

United States Patent and Trademark Office, "Final Office Action," issued in connection with U.S. Appl. No. 12/254,233, on Oct. 3, 2011 (29 pages).

United States Patent and Trademark Office, "Non-Final Office Action," issued in connection with U.S. Appl. No. 12/254,233, on Jan. 30, 2012 (29 pages).

United States Patent and Trademark Office, "Final Office Action," issued in connection with U.S. Appl. No. 12/334,248, on Oct. 3, 2011 (29 pages).

United States Patent and Trademark Office, "Non-Final Office Action," issued in connection with U.S. Appl. No. 12/334,248, on Jan. 30, 2012 (29 pages).

United States Patent and Trademark Office, "Notice of Allowance," issued in connection with U.S. Appl. No. 12/570,938, on Jun. 20, 2011 (14 pages).

United States Patent and Trademark Office, "Non-Final Office Action," issued in connection with U.S. Appl. No. 12/609,415, on Jun. 23, 2011 (12 pages).

United States Patent and Trademark Office, "Notice of Allowance," issued in connection with U.S. Appl. No. 12/609,683, on Jul. 12, 2011 (24 pages).

United States Patent and Trademark Office, "Non-Final Office Action," issued in connection with U.S. Appl. No. 12/967,930, on Apr. 29, 2011 (6 pages).

United States Patent and Trademark Office, "Notice of Allowance," issued in connection with U.S. Appl. No. 12/967,930, on Jan. 30, 2012 (13 pages).

United States Patent and Trademark Office, "Notice of Allowance," issued in connection with U.S. Appl. No. 10/744,921, on Apr. 23, 2012 (19 pages).

United States Patent and Trademark Office, "Notice of Allowance," issued in connection with U.S. Appl. No. 10/745,170, on Mar. 30, 2012 (7 pages).

United States Patent and Trademark Office, "Final Office Action," issued in connection with U.S. Appl. No. 12/609,415, on Mar. 7, 2012 (12 pages).

* cited by examiner

METHODS AND SYSTEMS FOR AUTOMATICALLY REROUTING DATA IN A DATA NETWORK

PRIORITY APPLICATIONS

This patent is a continuation of U.S. patent application Ser. No. 10/745,116, filed Dec. 23, 2003, which is hereby incorporated herein by reference in its entirety.

CROSS-REFERENCE TO RELATED APPLICATIONS

The present application is related to U.S. patent application Ser. No. 10/348,077, entitled "Method and System for Obtaining Logical Performance Data for a Circuit in a Data Network," filed on Jan. 21, 2003, and U.S. patent application Ser. No. 10/348,592, entitled "Method and System for Provisioning and Maintaining a Circuit in a Data Network," filed on Jan. 21, 2003. This application is also related to U.S. patent application Ser. No. 10/745,117, entitled "Method And System For Providing A Failover Circuit For Rerouting Logical Circuit Data In A Data Network," filed on Dec. 23, 2003; U.S. patent application Ser. No. 10/744,281, entitled "Method And System For Utilizing A Logical Failover Circuit For Rerouting Data Between Data Networks," filed on Dec. 23, 2003; U.S. patent application Ser. No. 10/745,047, entitled "Method And System For Automatically Renaming Logical Circuit Identifiers For Rerouted Logical Circuits In A Data Network," filed on Dec. 23, 2003; U.S. patent application Ser. No. 10/745,170, entitled "Method And System For Automatically Identifying A Logical Circuit Failure In A Data Network," filed on Dec. 23, 2003; U.S. patent application Ser. No. 10/744,921, entitled "Method And System For Automatically Rerouting Logical Circuit Data In A Data Network," filed on Dec. 23, 2003; U.S. patent application Ser. No. 10/745,168, entitled "Method And System For Automatically Rerouting Logical Circuit Data In A Virtual Private Network," filed on Dec. 23, 2003; U.S. patent application Ser. No. 10/744,283, entitled "Method And System For Real Time Simultaneous Monitoring Of Logical Circuits In A Data Network," filed on Dec. 23, 2003; U.S. patent application Ser. No. 10/744,555, entitled "Method And System For Prioritized Rerouting Of Logical Circuit Data In A Data Network," filed on Dec. 23, 2003. All of the above-referenced applications are assigned to the same assignee as the present application and are expressly incorporated herein by reference.

TECHNICAL FIELD

The present invention relates to the routing of data using logical circuits in a data network. More particularly, the present invention is related to automatically rerouting data in a data network.

BACKGROUND OF THE INVENTION

Data networks contain various network devices, such as switches, for sending and receiving data between two locations. For example, frame relay and Asynchronous Transfer Mode ("ATM") networks contain interconnected network devices that allow data packets or cells to be channeled over a circuit through the network from a host device to a remote device. For a given network circuit, the data from a host device is delivered to the network through a physical circuit such as a T1 line that links to a switch of the network. The remote device that communicates with the host through the network also has a physical circuit to a switch of the network. A network circuit also includes a logical circuit which includes a variable communication path for data between the switches associated with the host and the remote device.

In large-scale data networks, the host and remote end devices of a network circuit may be connected across different local access and transport areas ("LATAs") which may in turn be connected to one or more Inter-Exchange Carriers ("IEC") for transporting data between the LATAs. These connections are made through physical trunk circuits utilizing fixed logical connections known as Network-to-Network Interfaces ("NNIs"). Periodically, a logical circuit may become congested when the data being communicated exceeds certain predefined service parameters resulting in the logical circuit becoming overdriven or "overbalanced" due to excess data. As a result, data packets or cells between a host and remote device may be dropped.

Currently, overbalanced logical circuit conditions are managed by isolating the source of the network congestion and then troubleshooting the circuit to clear the congestion. However, current methods of handling overbalanced circuit conditions suffer from several drawbacks. One drawback is that isolating and clearing logical circuit congestion is time consuming and often requires taking the network circuit out of service to perform testing on both the logical and physical circuits. Moreover, if the congestion cannot be isolated by the technicians in a LATA or the congestion is located within the IEC, cooperative testing with the IEC must also be coordinated to isolate the failure congestion to a further increase in downtime in the network circuit.

It is with respect to these considerations and others that the present invention has been made.

SUMMARY OF THE INVENTION

In accordance with the present invention, the above and other problems are solved by a method for automatically rerouting data from an overbalanced logical circuit in a data network. When an overbalanced condition in a logical circuit is detected, the data in the overbalanced circuit may be rerouted to a "logical failover network," thereby minimizing lost data until the overbalanced condition in the logical circuit is cleared.

According to the method, status information is received for a logical circuit in the data network. The logical circuit includes a communication path for communicating data. Then, based on the status information, a determination is made as to whether an overbalanced condition is present in the logical circuit. An overbalanced condition is indicative of congestion in the logical circuit. The status information may include a forward explicit congestion notification ("FECN") and a backward explicit congestion notification ("BECN"). A logical failover circuit including an alternate communication path for communicating the data in the overbalanced logical circuit is then identified. Finally, the data in the overbalanced logical circuit is rerouted to the logical failover circuit without manual intervention. After rerouting the data to the logical failover circuit, the method may further include determining whether the overbalanced condition in the logical circuit has been cleared. If it is determined that the overbalanced condition in the logical circuit has been cleared, then the data from the logical failover circuit is rerouted to the logical circuit in the data network without manual intervention.

In identifying a logical failover circuit the method may further include identifying a logical connection in the logical circuit, based on the identification of the logical connection, determining a first end and a second end of the logical circuit in the data network, and determining a logical failover circuit comprising a communication path including the first end and the second end. The logical failover circuit may include a currently unused logical connection in the data network. The logical failover circuit may include a dedicated failover logical connection in a failover data network. The logical circuit and the logical failover circuit may be identified by logical circuit identifiers. The logical circuit identifiers may be data link connection identifiers ("DLCIs") or virtual path/virtual circuit identifiers ("VPI/VCIs"). The logical connections comprising the logical circuit and the logical failover circuit may be network-to-network interfaces ("NNIs"). The method may further include renaming a logical circuit identifier of the logical failover circuit to the logical circuit identifier of the logical circuit in the data network. The method may further include saving reroute data associated with the logical circuit upon rerouting the logical circuit data. The logical failover circuit may be either a permanent virtual circuit ("PVC") or a switched virtual circuit ("SVC"). The data network and the failover network may be either frame relay or asynchronous transfer mode ("ATM") networks.

In accordance with other aspects, the present invention relates to a system for automatically rerouting data from an overbalanced logical circuit in a data network. The system includes a network device for communicating status information for a logical circuit in the data network. The logical circuit includes a communication path for communicating data. The system further includes a logical element module, in communication with the network device, for receiving the status information for the logical circuit in the data network. The system further includes a network management module in communication with the logical element module. The network management module is operative to request the status information from the logical element module, determine an overbalanced condition in the logical circuit based on the status information, identify a logical failover circuit comprising an alternate communication path for communicating the data in the overbalanced logical circuit, and reroute the data to the logical failover circuit without manual intervention. When the overbalanced condition in the logical circuit is cleared, the network management module is further operative to reroute the data from the logical failover circuit to the logical circuit in the data network without manual intervention.

The system may further include a network database, in communication with the network management module, for storing logical connection data for the logical circuit. The network management module is further operative to identify a logical connection in the logical circuit. Based on the identification of the logical connection, the network management module is operative to access the network database to determine a first end and a second end of the logical circuit in the data network and determine a logical failover circuit including a communication path including the first end and the second end. The logical circuit may be identified by a first logical circuit identifier in the data network while the logical failover circuit may be identified by a second logical identifier in the data network. The network management module may be further operative to rename the second logical circuit identifier of the logical failover circuit to the first logical circuit identifier of the logical circuit prior to rerouting the data from the logical circuit to the logical failover circuit.

These and various other features as well as advantages, which characterize the present invention, will be apparent from a reading of the following detailed description and a review of the associated drawings.

DETAILED DESCRIPTION OF THE INVENTION

Figure 1:
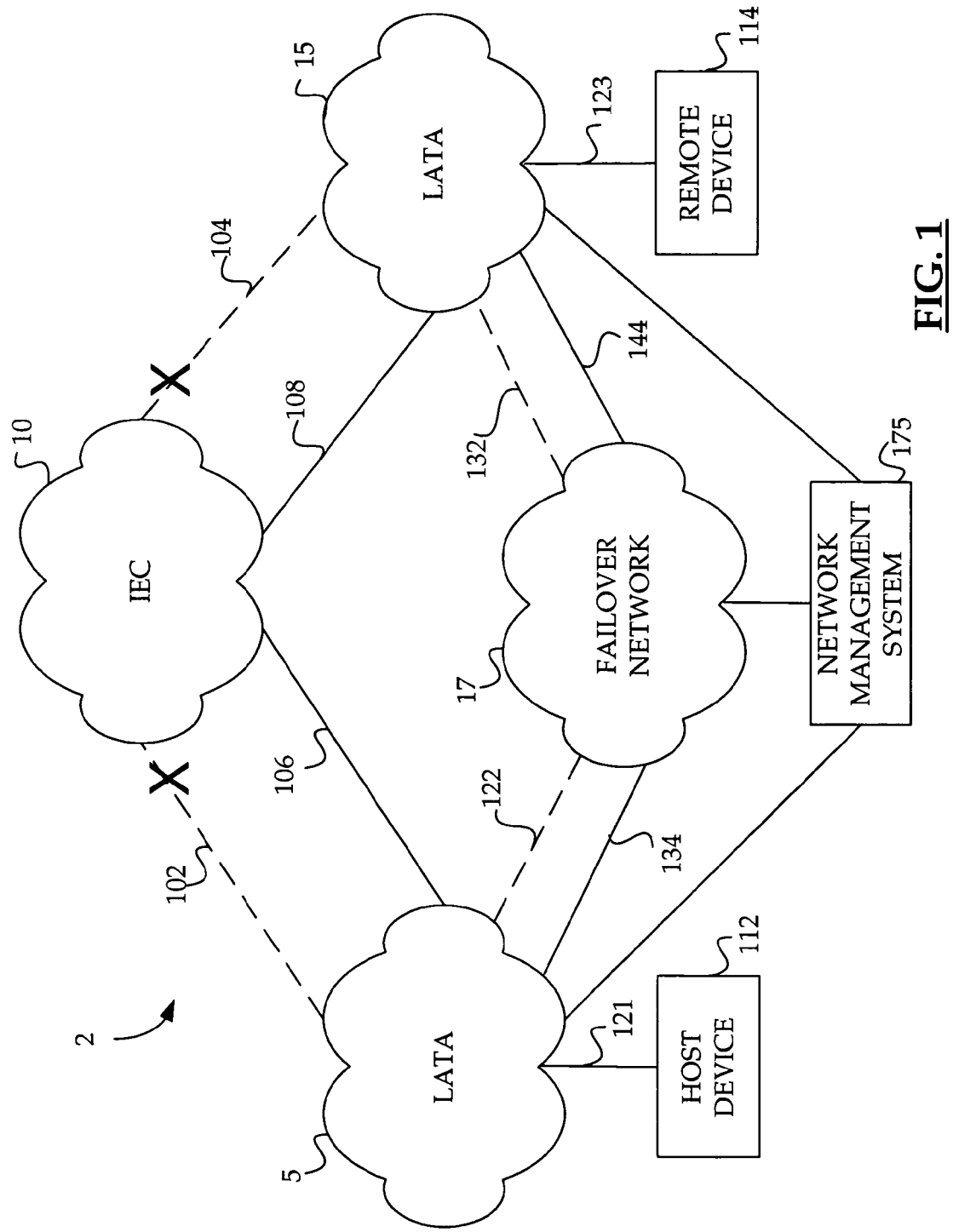
FIG. 1 illustrates a data network according to an embodiment of the invention.

Embodiments of the present invention provide for a method and system for automatically rerouting data from an overbalanced logical circuit in a data network. When an overbalanced condition in a logical circuit is detected, the data in the overbalanced circuit may be rerouted to a "logical failover network," thereby minimizing lost data until the overbalanced condition in the logical circuit is cleared. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Embodiments of the present invention may be generally employed in a data network 2 as shown in FIG. 1. The data network 2 includes local access and transport areas ("LATAs") 5 and 15 which are connected by an Inter-Exchange Carrier ("IEC") 10. It should be understood that the LATAs 5 and 15 may be data networks operated by a commonly owned Local Exchange Carrier ("LEC"). It should be further understood that the IEC 10 may include one or more data networks which may be operated by a commonly owned IEC. It will be appreciated by those skilled in the art that the data network 2 may be a frame relay network, asynchronous transfer mode ("ATM") network, or any other network capable of communicating data conforming to Layers 2-4 of the Open Systems Interconnection ("OSI") model developed by the International Standards Organization, incorporated herein by reference. It will be appreciated that these networks may include, but are not limited to, communications protocols conforming to the Multiprotocol Label Switching Standard ("MPLS") networks and the Transmission Control Protocol/Internet Protocol ("TCP/IP"), which are known to those skilled in the art.

The data network 2 includes a network circuit which channels data between a host device 112 and a remote device 114 through the LATA 5, the IEC 10, and the LATA 15. It will be appreciated by those skilled in the art that the host and remote devices 112 and 114 may be local area network ("LAN")

routers, LAN bridges, hosts, front end processors, Frame Relay Access Devices ("FRADs"), or any other device with a frame relay, ATM, or network interface. It will be further appreciated that in the data network 2, the LATAs 5 and 15 and the IEC 10 may include network elements (not shown) which support interworking to enable communications between host and remote devices supporting dissimilar protocols. Network elements in a data network supporting interworking may translate frame relay data packets or frames sent from a host FRAD to ATM data packets or cells so that a host device may communicate with a remote device having an ATM interface. The LATAs 5 and 15 and the IEC 10 may further include one or more interconnected network elements, such as switches (not shown), for transmitting data. An illustrative LEC data network will be discussed in greater detail in the description of FIG. 2 below.

The network circuit between the host device 112 and the remote device 114 in the data network 2 includes a physical circuit and a logical circuit. As used in the foregoing description and the appended claims, a physical circuit is defined as the physical path that connects the end point of a network circuit to a network device. For example, the physical circuit of the network circuit between the host device 112 and the remote device 114 includes the physical connection 121 between the host device 112 and the LATA 5, the physical connection 106 between the LATA 5 and the IEC 10, the physical connection 108 between the IEC 10 and the LATA 15, and the physical connection 123 between the LATA 15 and the remote device 114. Routers and switches within the LATAs 5 and 15 and the IEC 10 carry the physical signal between the host and remote end devices 112 and 114 through the physical circuit.

It should be understood that the host and remote devices may be connected to the physical circuit described above using user-to-network interfaces ("UNIs"). As is known to those skilled in the art, an UNI is the physical demarcation point between a user device (e.g., a host device) and a public data network. It will further be understood by those skilled in the art that the physical connections 106 and 108 may include trunk circuits for carrying the data between the LATAs 5 and 15 and the IEC 10. It will be further understood by those skilled in the art that the connections 121 and 123 may be any of various physical communications media for communicating data such as a 56 Kbps line or a T1 line carried over a four-wire shielded cable or over a fiber optic cable.

As used in the foregoing description and the appended claims, a logical circuit is defined as a portion of the network circuit wherein data is sent over variable communication data paths or logical connections established between the first and last network devices within a LATA or IEC network and over fixed communication data paths or logical connections between LATAs (or between IECs). Thus, no matter what path the data takes within each LATA or IEC, the beginning and end of each logical connection between networks will not change. For example, the logical circuit of the network circuit in the data network 2 may include a variable communication path within the LATA 5 and a fixed communication path (i.e., the logical connection 102) between the LATA 5 and the IEC 10. It will be understood by those skilled in the art that the logical connections 102 and 104 in the data network 2 may include network-to-network interfaces ("NNIs") between the last sending switch in a LATA and the first receiving switch in an IEC.

As is known to those skilled in the art, each logical circuit in a data network may be identified by a unique logical identifier. In frame relay networks, the logical identifier is called a Data Link Connection Identifier ("DLCI") while in ATM networks the logical identifier is called a Virtual Path Identifier/Virtual Circuit Identifier ("VPI/VCI"). In frame relay networks, the DLCI is a 10-bit address field contained in the header of each data frame and contains identifying information for the logical circuit as well as information relating to the destination of the data in the frame and service parameters for handling network congestion. For example, in the data network 2 implemented as a frame relay network, the designation DLCI 100 may be used to identify the logical circuit between the host device 112 and the remote device 114. It will be appreciated that in data networks in which logical circuit data is communicated through more than one carrier (e.g., an LEC and an IEC) the DLCI designation for the logical circuit may change in a specific carrier's network. For example, in the data network 2, the designation DLCI 100 may identify the logical circuit in the LATA 5 and LATA 15 but the designation DLCI 800 may identify the logical circuit in the IEC 10.

Illustrative service parameters which may be included in the DLCI include a Committed Information Rate ("CIR") parameter and a Committed Burst Size ("Bc") parameter. As is known to those skilled in the art, the CIR represents the average capacity of the logical circuit and the Bc represents the maximum amount of data that may be transmitted. It will be appreciated that the logical circuit may be provisioned such that when the CIR or the Bc is exceeded, the receiving switch in the data network will discard the frame. It should be understood that the logical circuit parameters are not limited to CIR and Bc and that other parameters known to those skilled in the art may also be provisioned, including, but not limited to, Burst Excess Size ("Be") and Committed Rate Measurement Interval ("Tc"). In ATM networks, the VPI/VCI is an address field contained in the header of each ATM data cell and contains identifying information for the logical circuit as well as information specifying a data cell's destination and specific bits which may indicate, for example, the existence of congestion in the network and a threshold for discarding cells.

It should be understood that the logical circuit in the data network 2 may be a permanent virtual circuit ("PVC") available to the network at all times or a temporary or a switched virtual circuit ("SVC") available to the network only as long as data is being transmitted. It should be understood that the data network 2 may further include additional switches or other interconnected network elements (not shown) creating multiple paths within each LATA and IEC for defining each PVC or SVC in the data network. It will be appreciated that the data communicated over the logical connections 102 and 104 may be physically carried by the physical connections 106 and 108.

The data network 2 may also include a failover network 17 for rerouting logical circuit data, according to an embodiment of the invention. The failover network 17 may include a network failover circuit including physical connections 134 and 144 and logical connections 122 and 132 for rerouting logical circuit data in the event of a failure in the network circuit between the host device 112 and the remote device 114. The failover network 17 will be described in greater detail in the description of FIG. 4 below. The data network 2 may also include a network management system 175 in communication with the LATA 5, the LATA 15, and the failover network 17. The network management system 175 may be utilized to obtain status information for the logical and physical circuit between the host device 112 and the remote device 114. The network management system 175 may also be utilized for rerouting logical data in the data network 2 between the host device 112 and the remote device 114. The network management system 175 will be discussed in greater detail in the description of FIG. 3 below.

Figure 2:
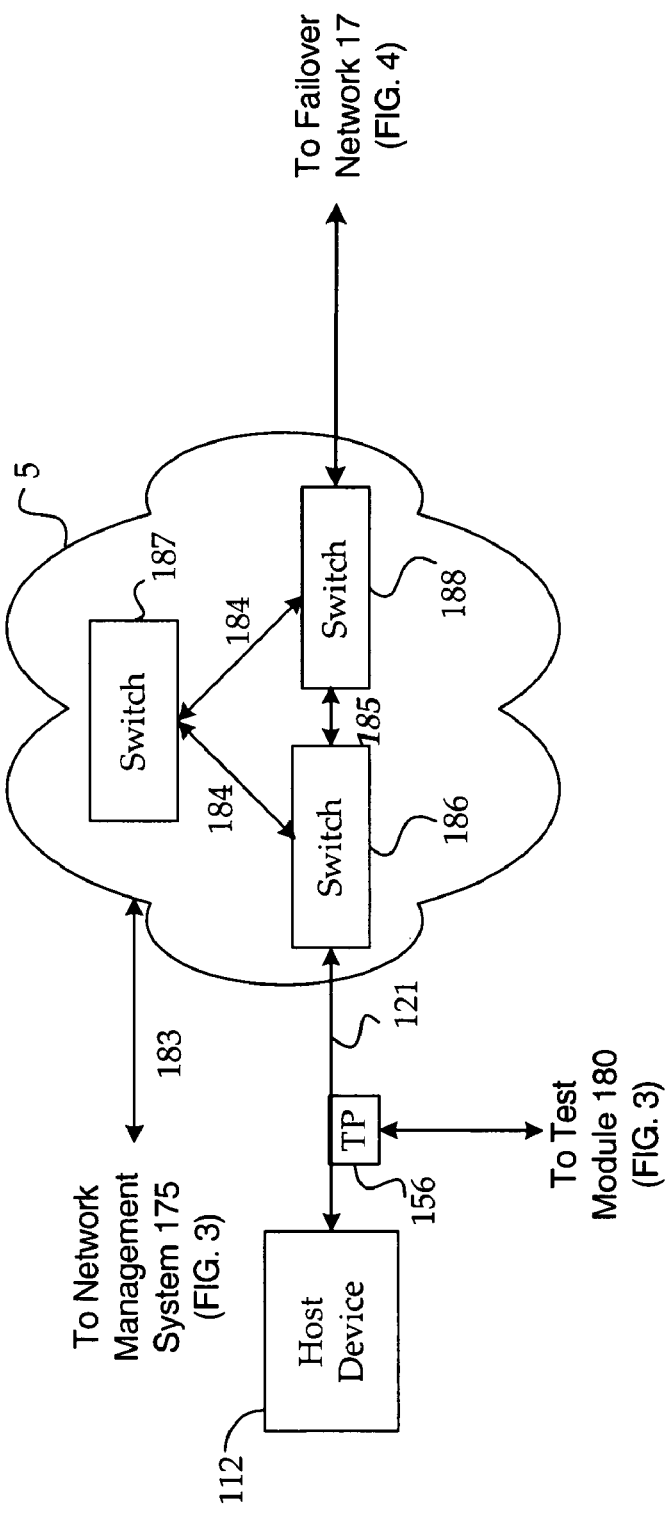
FIG. 2 illustrates a local access and transport area ("LATA") in the data network of FIG. 1, according to an embodiment of the invention.

FIG. 2 illustrates the LATA 5 in the data network 2 described in FIG. 1 above, according to an embodiment of the present invention. As shown in FIG. 2, the LATA 5 includes interconnected network devices such as switches 186, 187, and 188. It will be appreciated that the data network 2 may also contain other interconnected network devices and elements (not shown) such as digital access and cross connect switches ("DACS"), channel service units ("CSUs"), and data service units ("DSUs"). As discussed above in the description of FIG. 1, the connection data paths of a logical circuit within a data network may vary between the first and last network devices in a data network. For example, as shown in FIG. 2, the logical circuit in the LATA 5 may include the communication path 185 between the switches 186 and 188 or the communication path 184 between the switches 186, 187, and 188. As discussed above, it should be understood that the actual path taken by data through the LATA 5 is not fixed and may vary from time to time, such as when automatic rerouting takes place.

It will be appreciated that the switches 186, 187, and 188 may include a signaling mechanism for monitoring and signaling the status of the logical circuit in the data network 2. Each time a change in the status of the logical circuit is detected (e.g., a receiving switch begins dropping frames), the switch generates an alarm or "trap" which may then be communicated to a management station, such as a logical element module (described in detail in the description of FIG. 3 below), in the network management system 175. The trap may include, for example, status information indicating network congestion. The status information may include forward and backward explicit congestion notifications ("FECNs" and "BECNs"). As is known to those skilled in the art, a FECN is a frame relay message that notifies a receiving switch that there is congestion in the network. A FECN bit is sent in the same direction in which the frame was traveling, toward its destination. A BECN is a frame relay message that notifies a sending switch that there is congestion in the network. A BECN bit is sent in the opposite direction in which the frame is traveling, toward its transmission source.

In one embodiment, the signaling mechanism may be in accord with a Local Management Interface ("LMI") specification, which provides for the sending and receiving of "status inquiries" between a data network and a host or remote device. The LMI specification includes obtaining status information through the use of special management frames (in frame relay networks) or cells (in ATM networks). In frame relay networks, for example, the special management frames monitor the status of logical connections and provide information regarding the health of the network. In the data network 2, the host and remote devices 112 and 114 receive status information from the switches in the individual LATAs they are connected to in response to a status request sent in a special management frame or cell. The LMI status information may include, for example, whether or not the logical circuit is congested or whether or not the logical circuit has failed. It should be understood that the parameters and the signaling mechanism discussed above are optional and that other parameters and mechanisms may also be utilized to obtain connection status information for a logical circuit.

Figure 3:
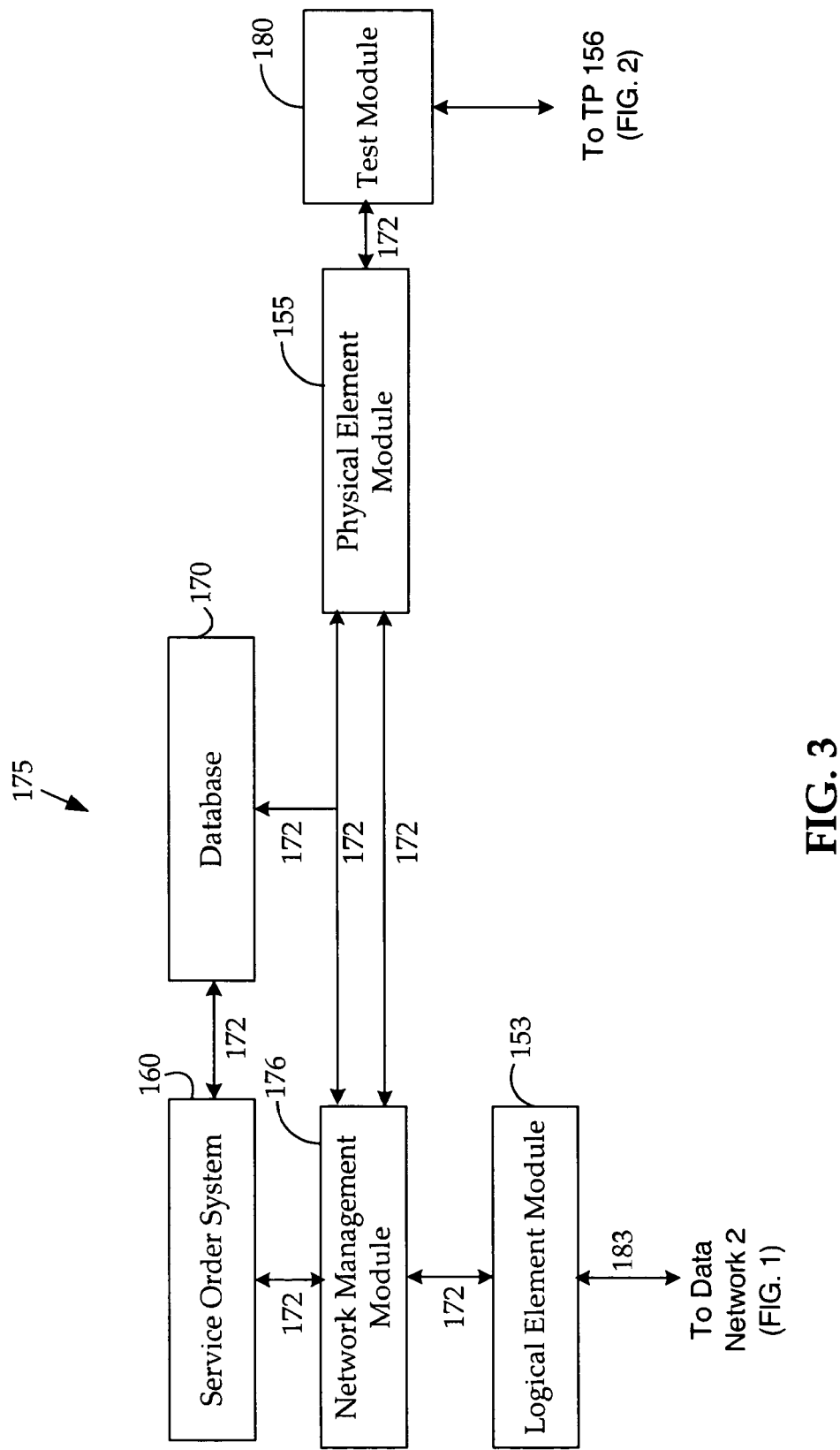
FIG. 3 illustrates a network management system which may be utilized to automatically reroute logical circuit data from an overbalanced logical circuit in the data network of FIG. 1, according to an embodiment of the invention.

FIG. 3 illustrates the network management system 175 which may be utilized to automatically reroute logical circuit data from a failed logical circuit in the data network of FIG. 1, according to an embodiment of the invention. The network management system 175 includes a service order system 160, a network database 170, a logical element module 153, a physical element module 155, a network management module 176, and a test module 180. The service order system 160 is utilized in the data network 2 for receiving service orders for provisioning network circuits. The service order includes information defining the transmission characteristics (i.e., the logical circuit) of the network circuit. The service order also contains the access speed, CIR, burst rates, and excess burst rates. The service order system 160 communicates the service order information to a network database 170 over management trunk 172. The network database 170 assigns and stores the parameters for the physical circuit portion of the network circuit such as a port number on the switch 186 for transmitting data over the physical connection 121 to and from the host device 112.

The network database 170 may also be in communication with an operations support system (not shown) for assigning physical equipment to the network circuit and for maintaining an inventory of the physical assignments for the network circuit. An illustrative operations support system is "TIRKS"® (Trunks Integrated Records Keeping System) marketed by TELECORDIA™ TECHNOLOGIES, Inc. of Morristown, N.J. The network database 170 may also be in communication with a Work Force Administration and Control system ("WFA/C") (not shown) used to assign resources (i.e., technicians) to work on installing the physical circuit.

The network management system 175 also includes the logical element module 153 which is in communication with the switches in the data network 2 through management trunks 183. The logical element module 153 runs a network management application program to monitor the operation of logical circuits which includes receiving trap data generated by the switches which indicate the status of logical connections. The trap data may be stored in the logical element module 153 for later analysis and review. The logical element module 153 is also in communication with the network database 170 via management trunks 172 for accessing information regarding logical circuits such as the logical identifier data. The logical identifier data may include, for example, the DLCI or VPI/VCI header information for each data frame or cell in the logical circuit including the circuit's destination and service parameters. The logical element module 153 may consist of terminals (not shown) that display a map-based graphical user interface ("GUI") of the logical connections in the data network. An illustrative logical element module is the NAVISCORE™ system marketed by LUCENT TECHNOLOGIES, Inc. of Murray Hill, N.J.

The network management system 175 further includes the physical element module 155 in communication with the physical connections of the network circuit via management trunks (not shown). The physical element module 155 runs a network management application program to monitor the operation and retrieve data regarding the operation of the physical circuit. The physical element module 155 is also in communication with the network database 170 via management trunks 172 for accessing information regarding physical circuits, such as line speed. Similar to the logical element module 153, the physical logical element module 155 may also consist of terminals (not shown) that display a map-based GUI of the physical connections in the LATA 5. An illustrative physical element module is the Integrated Testing and Analysis System ("INTAS"), marketed by TELECORDIA™ TECHNOLOGIES, Inc. of Morristown, N.J., which provides flow-through testing and analysis of telephony services.

The physical element module 155 troubleshoots the physical connections for a physical circuit by communicating with test module 180, which interfaces with the physical connections via test access point 156. The test module 180 obtains the status of the physical circuit by transmitting "clean" test signals to test access point 156 (shown in FIG. 2) which "loops back" the signals for detection by the test module 180. It should be understood that there may be multiple test access points on each of the physical connections for the physical circuit.

The network management system 175 further includes the network management module 176 which is in communication with the service order system 160, the network database 170, the logical element module 153, and the physical element module 155 through communications channels 172. It should be understood that in one embodiment, the network management system 175 may also be in communication with the LATA 15, the IEC 10, and the failover network 17. The communications channels 172 may be on a LAN. The network management module 176 may consist of terminals (not shown), which may be part of a general-purpose computer system that displays a map-based GUI of the logical connections in data networks. The network management module 176 may communicate with the logical element module 153 and the physical element module 155 using a Common Object Request Broker Architecture ("CORBA"). As is known to those skilled in the art, CORBA is an open, vendor-independent architecture and infrastructure which allows different computer applications to work together over one or more networks using a basic set of commands and responses. The network management module 176 may also serve as an interface for implementing logical operations to provision and maintain network circuits. The logical operations may be implemented as machine instructions stored locally or as instructions retrieved from the logical and physical element modules 153 and 155. An illustrative method detailing the provisioning and maintenance of network circuits in a data network is presented in U.S. patent application Ser. No. 10/348,592, entitled "Method And System For Provisioning And Maintaining A Circuit In A Data Network," filed on Jan. 23, 2003, and assigned to the same assignee as this application, which is expressly incorporated herein by reference. An illustrative network management module is the Broadband Network Management System® ("BBNMS") marketed by TELECORDIA™ TECHNOLOGIES, Inc. of Morristown, N.J.

Figure 4:
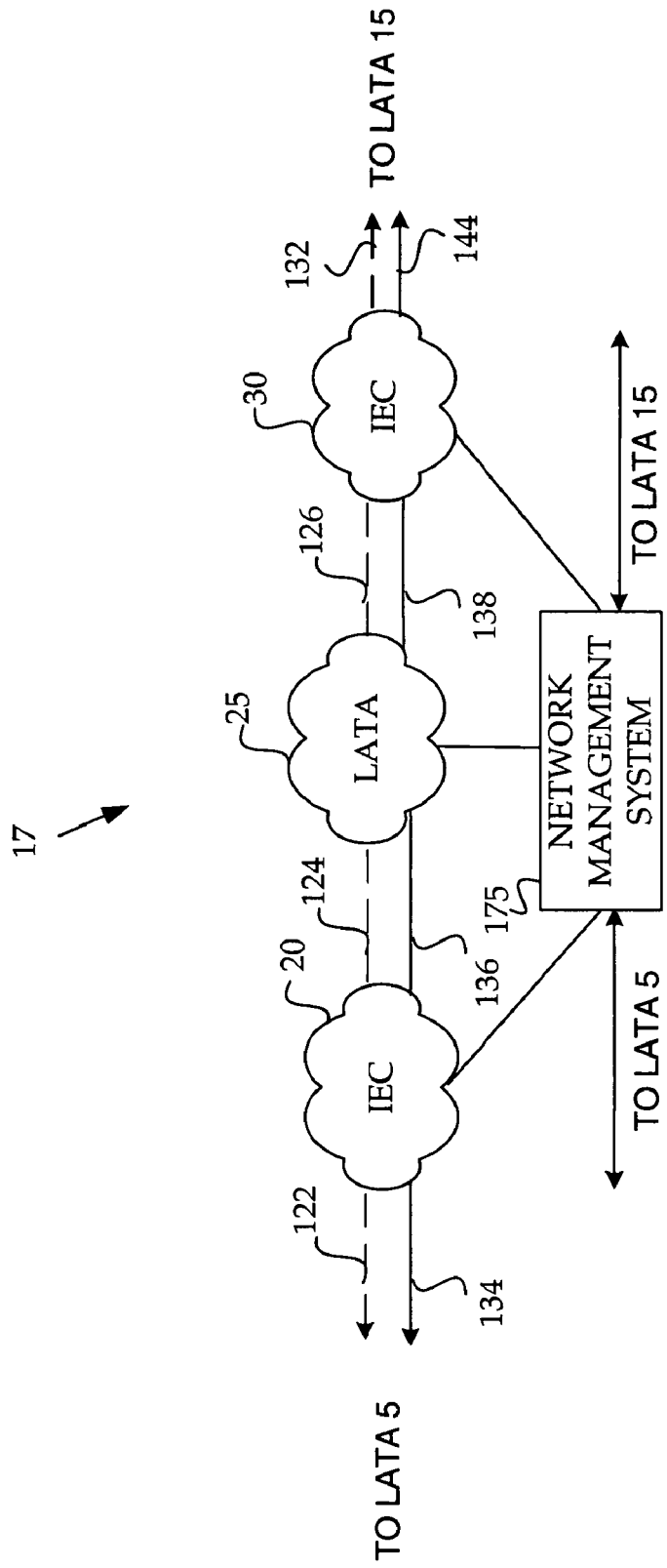
FIG. 4 illustrates a failover data network for rerouting logical circuit data, according to an embodiment of the invention.

FIG. 4 illustrates an illustrative failover data network for rerouting logical circuit data, according to one embodiment of the present invention. As shown in FIG. 4, the failover network 17 includes an IEC 20, a LATA 25, and an IEC 30. The failover network further includes a network failover circuit which includes a physical failover circuit and a logical fail over circuit. The physical failover circuit includes the physical connection 134 between the LATA 5 (shown in FIG. 1) and the IEC 20, the physical connection 136 between the IEC 20 and the LATA 25, the physical connection 138 between the LATA 25 and the IEC 30, and the physical connection 144 between the IEC 30 and the LATA 15 (shown in FIG. 1). Similarly, the logical failover circuit may include the logical connection 122 between the LATA 5 (shown in FIG. 1) and the IEC 20, the logical connection 124 between the IEC 20 and the LATA 25, the logical connection 126 between the LATA 25 and the IEC 30, and the logical connection 132 between the IEC 30 and the LATA 15 (shown in FIG. 1). It should be understood that in one embodiment, the network failover circuit illustrated in the failover network 17 may include a dedicated physical circuit and a dedicated logical circuit provisioned by a network service provider serving the LATAs 5, 15, and 25 and the IECs 20 and 30, for rerouting logical data from a failed logical circuit.

Figure 5:
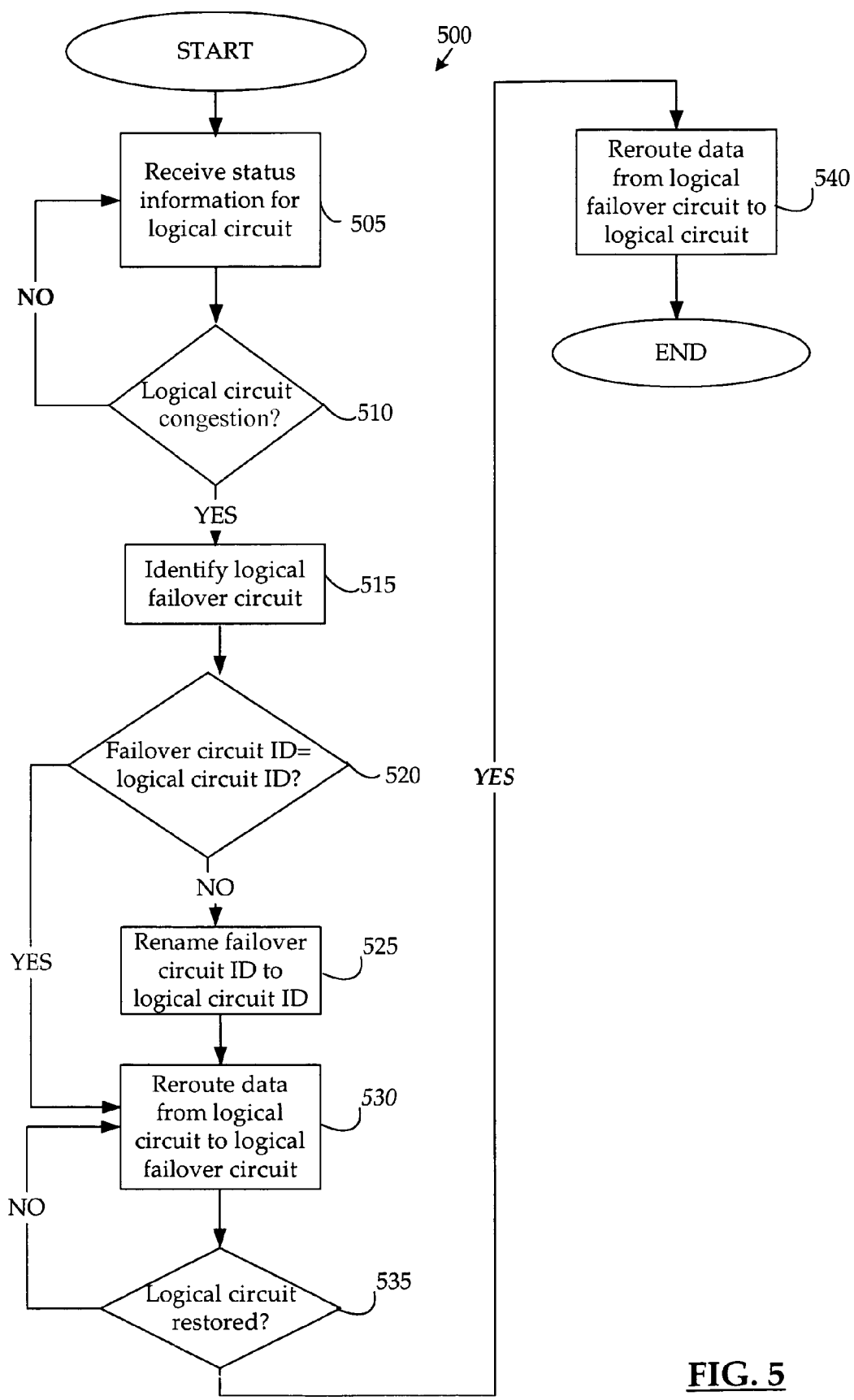
FIG. 5 illustrates a flowchart describing logical operations for rerouting data from an overbalanced logical circuit in the data network of FIG. 1, according to an embodiment of the invention.

FIG. 5 illustrates a flowchart describing logical operations 500 for automatically rerouting data from an overbalanced logical circuit in a data network, according to an embodiment of the invention. It will be appreciated that the logical operations 500 may be initiated when a customer report of a network circuit failure is received in the data network 2. For example, a customer at the remote device 114 may determine that the remote device 114 is dropping frames or cells sent from the host device 112 (e.g., by reviewing LMI status information in the host device). After receiving the customer report, the network service provider providing the network circuit may open a trouble ticket in the service order system 160 to troubleshoot the logical circuit.

The logical operations 500 begin at operation 505 where the network management module 176 receives status information for a logical circuit in the data network 2. It will be appreciated that in one embodiment, the status information may be received by communicating with the logical element module 153 to request trap data generated by one or more switches in the data network 2 which indicate the status of one or more logical connections making up the logical circuit. It will be appreciated that in one embodiment of the present invention, the communication of the status information for the logical circuit may be manually initiated by a technician from a terminal in the network management module 176. In another embodiment of the present invention, the network management module 176 may be configured to automatically monitor the logical circuits for trap data to identify logical circuit congestion in the data network 2.

After receiving the status information for the logical circuit at operation 505, the logical operations 500 continue at operation 510 where the network management module 176 determines whether the logical circuit is overbalanced (i.e., congested) based on the received status information. It should be understood that a logical circuit is overbalanced when one or more logical connections in a logical circuit are overbalanced. As discussed above in the description of FIG. 2, trap data indicating an overbalanced logical connection may include FECNs and BECNs from a sending switch and a receiving switch indicating dropped frames or cells in the data network 2. These traps may be generated, for example, when the maximum CIR or Bc (as specified in the DLCI of a frame in a frame relay network, for example) is exceeded. For example, in the data network 2 shown in FIG. 1, the "X" marking the logical connections 102 and 104 indicate that both connections are dropping frames or cells for the logical circuit in the LATA data networks 5 and 15. In this example, such a condition may indicate that a receiving switch in the IEC 10 is sending a BECN to a sending switch in the LATA 5 over the logical connection 102 while a sending switch in the IEC 10 is sending a FECN to a receiving switch in the LATA 15 over the logical connection 104. It will be appreciated that in this example, the logical circuit congestion lies in the IEC data network 10.

If at operation 510, it is determined that the logical circuit is not overbalanced, the logical operations 500 then return to operation 505 where the network management module 176 again receives status information for the logical circuit. If, however, at operation 510 it is determined that the logical circuit is overbalanced, the logical operations continue to operation 515. At operation 515, the network management module 176 identifies a logical failover circuit for rerouting the data from the logical circuit in the data network. For example, if as shown in FIG. 1, it is determined that the congestion in the overbalanced logical circuit in the data network 2 has been isolated to the IEC data network 10, a logical failover circuit in the failover network 17 may be automatically selected to reroute the logical data such that it bypasses the IEC data network 10. For example, the logical failover circuit may be selected including the logical connections 122, 124, 126, and 132 (as shown in FIG. 4) to reroute the logical data from the host device 112, through the LATA 5, the IEC 20, the LATA 25, the IEC 30, the LATA 15, and finally to the remote device 114.

It should be understood that the network management module 176 may select the logical failover circuit by identifying a logical connection or NNI in the overbalanced logical circuit. Information related to each logical connection in a logical circuit may be stored in the database 170 including the first and second ends of the logical circuit to which the logical connection belongs. Once the ends of a logical circuit are determined by accessing the database 170, the network management module 176 may select a logical failover circuit having a communication path including the first and second ends of the overbalanced logical circuit for rerouting data.

It will be appreciated that in one embodiment, the logical failover circuit selected may be a dedicated circuit which is only utilized for rerouting logical data from the overbalanced logical circuit (i.e., the failover circuit does not normally communicate data traffic). In another embodiment, the logical failover circuit may be an existing logical circuit which is normally utilized for communicating data traffic in the data network 2. In this embodiment, the selection of the logical failover circuit may also include determining whether one or more logical connections in the logical circuit are currently communicating data traffic or are currently unused. If currently unused, the logical connections may be selected for rerouting logical data. For example, a technician at the logical element module 153 or the network management module 176 may utilize a map-based GUI displaying the logical connections in the LATA data networks 5 and 15 and their status. A dedicated logical failover circuit (or a currently unused logical circuit with available logical connections) may then be selected as a logical failover circuit for communicating logical data from a failed logical circuit. The logical operations 500 then continue from operation 515 to operation 520.

As discussed above, the logical circuits in a data network are identified by a logical circuit identifier (ID). At operation 520, the network management module 176 compares the identifier (e.g., the DLCI or VPI/VCI) of the logical circuit to the identifier of the selected logical failover circuit. If at operation 520, it is determined that the identifier's of the failed logical circuit and the logical failover circuit are the same, the logical operations 500 then continue from operation 520 to operation 530. If, however, at operation 520 it is determined that logical circuit identifiers of the failed logical circuit and the logical failover circuit are not the same, the logical operations 500 then continue from operation 520 to operation 525 where the network management module 176 renames the logical circuit ID of the logical failover circuit to the ID of the failed logical circuit. The logical operations 500 then continue from operation 525 to operation 530.

It will be appreciated that in the failover network 17, a dedicated failover logical circuit may be assigned to an existing logical circuit in a data network and identified with the same ID as the existing logical circuit. However, a logical failover circuit which is already an existing logical circuit (i.e., normally communicates data traffic in a data network) is already assigned a unique logical circuit ID. Thus, in the presently described embodiment of the invention, the logical identifier of a logical failover circuit may be renamed so that it is in accord with a current logical identifier of a logical circuit. For example, in a frame relay data network, a logical circuit may be identified as DLCI 100 while a logical failover circuit may be identified as DLCI 250. The logical failover circuit may be renamed from DLCI 250 to DLCI 100. It will further be appreciated that the network management module 176 may store the changes to logical circuit identifiers as reroute data in the database 170. This reroute data may then be accessed to restore the original logical identifiers to the logical failover circuit once the trouble in the failed logical circuit has been repaired.

At operation 530 the network management module 176 reroutes the data from the overbalanced logical circuit to the logical failover circuit. It will be appreciated that the reroute of the data may be accomplished from the logical management module 153 or the network management module 176 which, in communication with the switches in the data network 2 (and the failover network 17), sends instructions to reroute the logical data from the NNIs or logical connections 102 and 104 to the failover NNIs or logical connections 122, 124, 126, and 132 in the logical failover circuit. The logical operations 500 then continue from operation 530 to operation 535.

At operation 535, the network management module 176 determines the failed logical circuit has been restored. This determination may be made, for example, by receiving a confirmation from the IEC data network 10 that the failed logical connections 102 and 104 have been restored or from continuous or periodic logical circuit monitoring performed by the logical element module 153 in communication with the network management module 176, to establish that the logical connections are successfully communicating data. If at operation 535 it is determined that the overbalanced logical circuit has not been restored, the logical operations 500 return to operation 530 where the rerouting of the data is maintained on the logical failover circuit. If however, at operation 535, it is determined that the overbalanced logical circuit has been restored, then the logical operations 535 continue to operation 540 where the data on the network failover circuit is rerouted back to the restored logical circuit. Similar to the rerouting of the logical data onto the logical failover circuit, the rerouting of the logical data back onto the restored logical circuit may be accomplished from the network management module 176 which, in communication with the switches in the data network 2 (and the failover network 17) sends instructions to reroute the data from the failover NNIs or logical connections 122, 124, 126, and 132 to the restored NNIs or logical connections 102 and 104 in the restored logical circuit. The logical operations 500 then end.

It will be appreciated that in one embodiment, the logical circuit failover procedure may be initiated as a service offering by a Local Exchange Carrier (LEC) to an Inter-Exchange Carriers (IEC) for rerouting congested or overbalanced logical circuits. Thus, an IEC may utilize a LEC's data network for relieving overbalanced logical circuits. In another embodiment, the logical circuit failover procedure may be initiated as part of a customer subscription service offered by the network service provider. The subscription service may include use of the logical failover circuit for a predetermined time period after the customer's data has been rerouted. For example, a customer subscribing to the failover service would automatically have the logical circuit failover procedure initiated and the customer's data would be rerouted for up to two hours over the logical failover circuit after a determination that the customer's network circuit has failed. If a customer is not a subscriber, the failover service may still be initiated and the customer may be billed based on the length of time the failover service was in service. In another embodiment, the customer may be offered the failover service by the service provider in real-time (i.e., upon determining a logical circuit 5 failure).

It will be appreciated that the embodiments of the invention described above provide for a method and system for automatically rerouting data from an overbalanced logical circuit in a data network. When an overbalanced condition in a logical circuit is detected, the data in the overbalanced circuit may be rerouted to a "logical failover network," thereby minimizing lost data until the overbalanced condition in the logical circuit is cleared. The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

Figure 6:
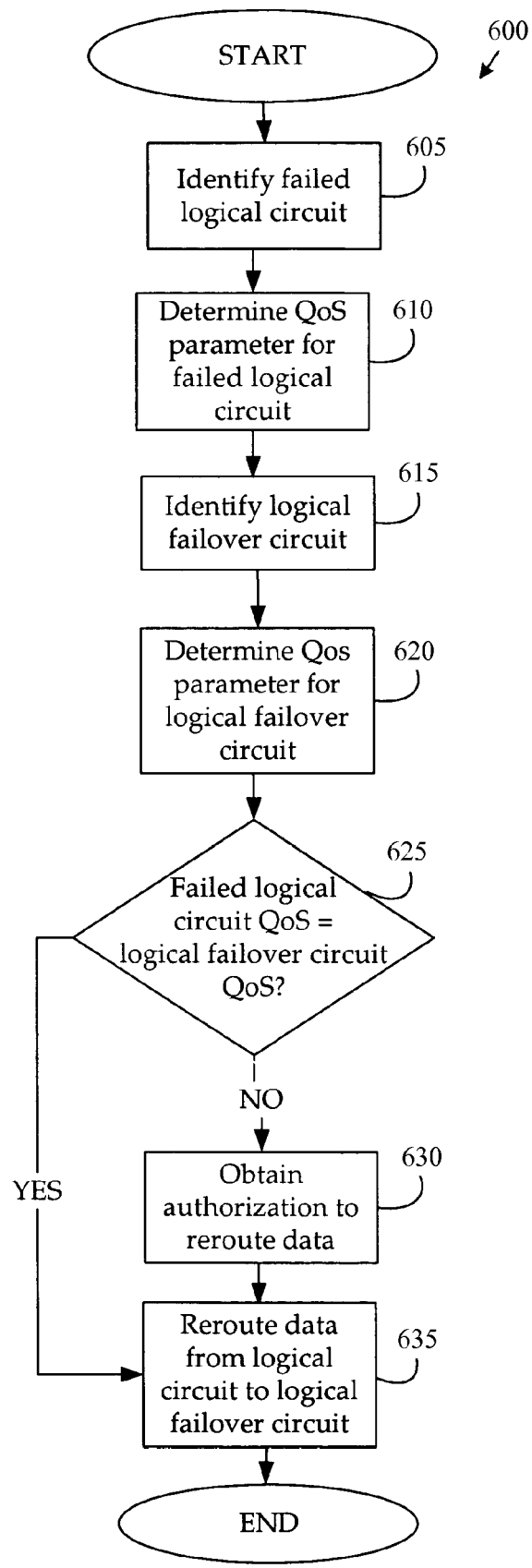
FIG. 6 illustrates a flowchart describing logical operations for prioritized rerouting of logical circuit data in a data network of FIG. 1.

FIG. 6 illustrates a flowchart describing logical operations 600 for prioritized rerouting of logical circuit data in the data network 2 of FIG. 1, according to an embodiment of the invention. It will be appreciated that the logical operations 600 may be initiated when a customer report of a network circuit failure is received in the data network 2. For example, a customer at the remote device 114 may determine that the remote device 114 is dropping frames or cells sent from the host device 112 (e.g., by reviewing LMI status information in the host device). After receiving the customer report, the network service provider providing the network circuit may open a trouble ticket in the service order system 160 to troubleshoot the logical circuit.

The logical operations 600 begin at operation 605 where the network management module 176 identifies a failed logical circuit in the data network 2. It will be appreciated that a logical circuit failure may be based on status information received in communications with the logical element module 153 to request trap data generated by one or more switches in the data network 2. The trap data indicates the status of one or more logical connections making up the logical circuit. For example, in the data network 2 shown in FIG. 1, the "X" marking the logical connections 102 and 104 indicates that both connections are "down beyond" the logical connections in the LATA data networks 5 and 15. It will be appreciated that in this example, the logical circuit failure lies in the IEC data network 10. An illustrative method detailing the identification of logical circuit failures in a data network is presented in co-pending U.S. patent application Ser. No. 10/745,170, entitled "Method And System For Automatically Identifying A Logical Circuit Failure In A Data Network,", filed on Dec. 23, 2003, and assigned to the same assignee as this application, which is expressly incorporated herein by reference.

After identifying a failed logical circuit at operation 605, the logical operations 600 continue at operation 610 where the network management module 176 determines the quality of service ("QoS") parameter for the communication of data in the failed logical circuit. As discussed above in the description of FIG. 1, the QoS parameters for a logical circuit are contained within the DLCI (for frame relay circuits) or the VPI/VCI (for ATM circuits). The QoS parameters for logical circuits may also be stored in the network database 170 after the circuits are provisioned in the data network. Thus, in one embodiment of the present invention, the network management module 176 may determine the logical identifier for the failed logical circuit from the trap data received from the logical element module 153 and then access the database 170 to determine the QoS parameter for the circuit. The logical operations then continue from operation 610 to operation 615.

At operation 615, the network management module 176 identifies a logical failover circuit for communicating failed logical circuit data over an alternate communication in the data network 2. For example, if as shown in FIG. 1, it is determined that the failure in the logical circuit in the data network 2 has been isolated to the IEC data network 10, a logical failover circuit in the failover network 17 may be automatically selected to reroute the logical data such that it bypasses the IEC data network 10. For example, the logical failover circuit may be selected including the logical connections 122, 124, 126, and 132 (as shown in FIG. 4) to reroute the logical data from the host device 112, through the LATA 5, the IEC 20, the LATA 25, the IEC 30, the LATA 15, and finally to the remote device 114.

It should be understood that the network management module 176 may select the logical failover circuit by identifying a logical connection or NNI in the overbalanced logical circuit. Information related to each logical connection in a logical circuit may be stored in the database 170 including the first and second ends of the logical circuit to which the logical connection belongs. Once the ends of a logical circuit are determined by accessing the database 170, the network management module 176 may select a logical failover circuit having a communication path including the first and second ends of the overbalanced logical circuit for rerouting data.

It will be appreciated that in one embodiment, the logical failover circuit selected may be a dedicated circuit which is only utilized for rerouting logical data from the failed logical circuit (i.e., the failover circuit does not normally communicate data traffic). In this embodiment, the logical failover circuit may be provisioned with the same QoS parameter as the logical circuit to which it is assigned. In another embodiment, the logical failover circuit may be an existing logical circuit which is normally utilized for communicating data traffic in the data network 2. In this embodiment, the selection of the logical failover circuit may also include determining whether one or more logical connections in the logical circuit are currently communicating data traffic or are currently unused. If currently unused, the logical connections may be selected for rerouting logical data. For example, a technician at the logical element module 153 or the network management module 176 may utilize a map-based GUI displaying the logical connections in the LATA data networks 5 and 15 and their status. A dedicated logical failover circuit (or a currently unused logical circuit with available logical connections) may then be selected as a logical failover circuit for communicating logical data from a failed logical circuit. The logical operations 600 then continue from operation 615 to operation 620.

At operation 620, the network management module 176 determines the QoS parameter for the previously identified logical failover circuit. It will be appreciated that the identification of the QoS parameter for the logical failover circuit may be made by identifying the logical circuit ID for the logical failover circuit and then accessing the network database 170 to retrieve the QoS parameter for the circuit. The logical operations 600 then continue from operation 620 to operation 625.

At operation 625, the network management module 176 compares the QoS parameters for the failed logical circuit and the logical failover circuit to determine if they are the same. If the QoS parameters are the same, the logical operations continue to operation 635 where the failed logical circuit data is rerouted over the logical failover circuit. An illustrative method detailing the rerouting of failed logical circuits in a data network is presented in co-pending U.S. patent application Ser. No. 10/744,921, entitled "Method And System For Automatically Rerouting Logical Circuit Data In A Data Network,", filed on Dec. 23, 2003, and assigned to the same assignee as this application, which is expressly incorporated herein by reference.

For example, if the network management module 176 determines that the QoS for the failed logical circuit and the logical failover circuit is constant bit rate ("CBR"), then the failed logical circuit data is rerouted over the logical failover circuit while maintaining the same quality of service. It will be appreciated that in data networks supporting interworking (i.e., both frame relay and ATM devices), the network management module 176 may be configured to reroute logical circuit data based on similar QoS parameters from each protocol. For example, if the failed logical circuit has a frame relay QoS parameter of variable frame relay ("VFR") real time, the network management module 176 may reroute the data to an ATM logical failover circuit having a QoS parameter of variable bit rate ("VBR") real time, since these quality of service parameters are defined to tolerate only small variations in transmission rates. Similarly, a failed logical circuit having an ATM QoS parameter of unspecified bit rate ("UBR") may be rerouted over a frame relay logical failover circuit having a QoS of VFR non-real time since both of these parameters are tolerant of delay and variable transmission rates.

If, however, at operation 625, the network management module 176 determines that the QoS parameters for the failed logical circuit and the logical failover circuit are not the same, then the logical operations continue from operation 625 to operation 630 where the network management module 176 obtains authorization to reroute the logical circuit data. Once authorization is received, the logical operations 630 then continue to operation 635 where the failed logical circuit data is rerouted over the logical failover circuit. It will be appreciated that authorization may be obtained if the logical failover circuit is provisioned for a lower quality of service than the failed logical circuit. For example, authorization may be obtained from an ATM circuit customer with a QoS parameter of CBR to reroute logical circuit data to a failover logical circuit with a QoS parameter of VBR real time. It will be appreciated that in some instances, a customer unwilling to accept delay and variable transmission rates for high priority data (such as voice) may not wish data to be rerouted over a lower priority circuit. The logical operations 600 then end.

What is claimed is:

1. A method of automatically rerouting data, the method comprising:
   identifying congestion in a logical circuit, the logical circuit comprising at least a first communication path operated by a first carrier, a second communication path operated by a second carrier, and a third communication path, the congestion identified based on monitoring at the first communication path operated by the first carrier;
   based on the congestion identified by the monitoring, determining that the congestion is isolated to the second communication path operated by the second carrier;
   determining a quality of service of an alternate communication path and a quality of service of the second communication path; and
   when the quality of service of the alternate communication path at least matches the quality of service of the second communication path, rerouting data associated with the logical circuit without manual intervention using the alternate communication path to bypass the second communication path operated by the second carrier, the rerouting comprising routing the data through the first communication path, the alternate communication path, and the third communication path.

2. A method as defined in claim 1, wherein the alternate communication path comprises a logical failover circuit, the logical circuit associated with a first logical circuit identifier, the logical failover circuit associated with a second logical circuit identifier.

3. A method as defined in claim 2, further comprising, prior to rerouting the data, renaming the second logical circuit identifier of the logical failover circuit to the first logical circuit identifier of the logical circuit.

4. A method as defined in claim 1, wherein the alternate communication path comprises a second logical circuit through at least two carrier networks.

5. A method as defined in claim 4, wherein the second logical circuit is a dedicated circuit for use only to reroute for congested circuits.

6. A method as defined in claim 1, wherein the rerouting of the data associated with the logical circuit comprises rerouting the data by a network management system in communication with the first and third communication paths, the network management system being separate from switches through which the data is communicated.

7. An apparatus to automatically reroute data, the apparatus comprising:
   a logical element module in communication with switches of a logical circuit to receive status information indicative of congestion in the logical circuit, the logical circuit comprising at least a first communication path operated by a first carrier, a second communication path operated by a second carrier different from the first carrier, and a third communication path, the congestion identified based on monitoring information collected at the first communication path operated by the first carrier;
   a network management module to:
      based on the monitoring information, determine that the congestion is isolated to the second communication path operated by the second carrier;
      determine a quality of service of an alternate communication path and a quality of service of the second communication path; and
      when the quality of service of the alternate communication path at least matches the quality of service of the second communication path, reroute data associated with the logical circuit without manual intervention using the alternate communication path to bypass the second communication path operated by the second carrier, the rerouting comprising routing the data through the first communication path, the alternate communication path, and the third communication path.

8. An apparatus as defined in claim 7, wherein the alternate communication path comprises a logical failover circuit, the logical circuit associated with a first logical circuit identifier, the logical failover circuit associated with a second logical circuit identifier.

9. An apparatus as defined in claim 8, wherein, prior to rerouting the data, the network management module is to rename the second logical circuit identifier of the logical failover circuit to the first logical circuit identifier of the logical circuit.

10. An apparatus as defined in claim 7, wherein the alternate communication path comprises a second logical circuit through a first inter-exchange carrier, a local access and transport area, and a second inter-exchange carrier.

11. An apparatus as defined in claim 10, wherein the network management module reroutes the data from the first communication path to the first inter-exchange carrier, from the first inter-exchange carrier to the local-access and transport area, from the local-access and transport area to the second inter-exchange carrier, and from the second inter-exchange carrier to the third communication path.

12. An apparatus as defined in claim 7, wherein the logical element module and the network management module are separate from the switches of the logical circuit through which the data is communicated.

13. An apparatus as defined in claim 12, wherein the network management module is in communication with the switches through management trunks.

14. A tangible computer-readable medium, excluding propagating signals, having instructions stored thereon that, when executed, cause a machine to at least:
 identify congestion in a logical circuit, the logical circuit comprising at least a first communication path operated by a first carrier, a second communication path operated by a second carrier different from the first carrier, and a third communication path, the congestion identified based on monitoring information corresponding to the first communication path operated by the first carrier;
 based on the monitoring information, determine that the congestion is isolated to the second communication path operated by the second carrier;
 determine a quality of service of an alternate communication path and a quality of service of the second communication path; and
 when the quality of service of the alternate communication path at least matches the quality of service of the second communication path, reroute data associated with the logical circuit without manual intervention using the alternate communication path to bypass the second communication path operated by the second carrier by routing the data through the first communication path, the alternate communication path, and the third communication path.

15. A computer-readable medium as defined in claim 14, wherein the alternate communication path comprises a logical failover circuit, the logical circuit associated with a first logical circuit identifier, the logical failover circuit associated with a second logical circuit identifier.

16. A computer-readable medium as defined in claim 15 having instructions stored thereon that, when executed, further cause the machine to, prior to rerouting the data, rename the second logical circuit identifier of the logical failover circuit to the first logical circuit identifier of the logical circuit.

17. A computer-readable medium as defined in claim 14, wherein the alternate communication path comprises a second logical circuit through a first inter-exchange carrier, a local access and transport area, and a second inter-exchange carrier.

18. A computer-readable medium as defined in claim 17, wherein the second logical circuit is a dedicated circuit for use only to reroute for congested circuits.

19. A computer-readable medium as defined in claim 14, wherein the instructions are to be executed by a network management system coupled to the first and third communication paths, the network management system being separate from switches through which the data is communicated.

* * * * *